(No Model.)

G. BLAKISTONE.
WHEEL FENDER OR GUARD FOR CARS.

No. 513,701. Patented Jan. 30, 1894.

WITNESSES
Dan'l Fisher
George Hemsley

INVENTOR
Geo. Blakistone

UNITED STATES PATENT OFFICE.

GEORG BLAKISTONE, OF BALTIMORE, MARYLAND.

WHEEL FENDER OR GUARD FOR CARS.

SPECIFICATION forming part of Letters Patent No. 513,701, dated January 30, 1894.

Application filed June 29, 1893. Serial No. 479,106. (No model.)

*To all whom it may concern:*

Be it known that I, GEORG BLAKISTONE, of the city of Baltimore and State of Maryland, have invented certain Improvements in Wheel Fenders or Guards for Cars, of which the following is a specification.

In the description of the said invention which follows, reference is made to the accompanying drawings forming a part hereof, and in which—

Figure 1:
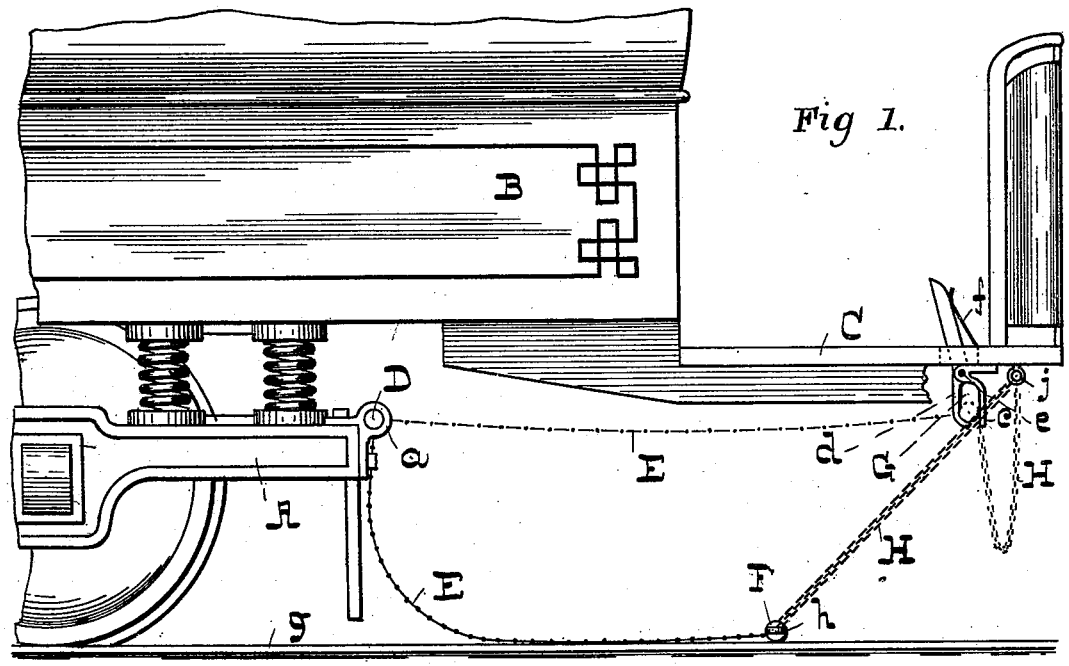
Figure 2:
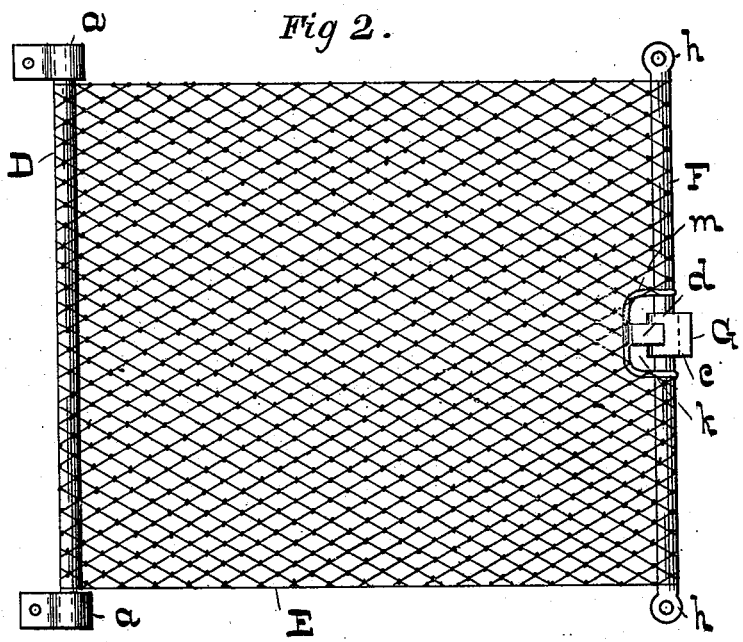

Figure 1 is a side elevation of the front end of a street car provided with the present invention, and Fig. 2 a top view of the invention alone.

Referring to the drawings, A is the front truck, B the body, and C the front platform of the car.

D is a bar attached in any suitable manner to the front end of the truck A, and it is shown as supported by two brackets $a$ bolted to the truck.

E is a sheet of flexible material, preferably cord netting, unsupported at its lateral edges attached to the bar D and provided with a second and loose bar F at its front or lower edge. The length of the sheet netting is such that the bar F may be hung under and near to the front edge of the platform C when the guard is not in use.

G is a holder or catch whereby the bar F is supported, when the device is not in use and the sheet netting E extended, as shown by their dotted delineation in Fig. 1.

I do not limit myself to a holder of any peculiar construction, but the one which I prefer consists of two arms $c$ and $d$ hinged together at $e$ under the platform C. The arm $c$ is fixed, and the other $d$ movable and made to extend upward through the platform so that it can be operated by the foot of the motor man when the invention is applied to an electric car.

In cable cars, the construction of the holder may have to be changed, particularly when the grip man is stationed some distance in the rear of the front platform. A spring $f$ serves to effect the closing of the lower end of the arm $d$ of the holder partially around or upon the bar F. The bar F is permanently connected to the lower side of the platform near its front, by means of two cords or chains H of such length as will admit of the bar F, when released from the holder, being dragged on the rails $g$ some distance in the rear of the front end of the platform, as shown in Fig. 1. To admit of the attachment of the cords or chains H to the bar F that device has eyes $h$. See Fig. 2. Eye bolts $j$ serve as means of connection between the cords or chains H and the platform of the car. See Fig. 1.

In order that the netting may not interfere with the application of the holder G to the bar F, I provide the netting with a space $k$ and bind the edge of the space with a cord $m$. See Fig. 2.

When the invention is not in use, the bar F is held in place by the holder G and the cords or chains H hang in loops, as shown in dotted lines in Fig. 1.

Should a person fall on the track in front of the car, and the motor man see that it is impossible to stop the car in time to prevent the person being run over, he strikes the upper end of the arm $d$ with his foot which opens the holder and releases the bar F which falls to the track and the guard assumes the position shown in full lines in Fig. 1. The bar F in being dragged along the track, passes under the person and he is finally caught in the netting which being unconfined at its lateral edges conforms to the shape of the person who is held in comparative safety until the car stops. After the removal of the person from the netting, the motor man lifts the bar F and inserts it in the holder where it remains until again to be used.

It will be seen from the construction of this device that there is no projection beyond the front of the car, and that the flexible sheet or netting and its attachments are located beneath and behind the front platform. Such construction carries several advantages. It would frequently enable one crossing in front of the car, to get out of its way before being struck. It also gives the motorman or gripman the maximum distance within which to stop his car, and as the impelling chains or devices for that purpose project backward instead of forward, it pulls the net or flexible sheet as distinguished from pushing it; this feature protects the parts and diminishes their liability to break; if for example the propelling chains were rigid rods projected forward and pushed, a solid obstruction would be likely to break whatever part of the device was weakest; but when the net is pulled it would probably yield and pass over it even though the propelling devices were made rigid or non-flexible; it also enables us to construct the device so as to practically touch the track when lowered.

I claim as my invention—

1. A safety net or flexible sheet, located under and backward of the front of the car body and attached at its rear end to a suitable part of the car, in combination with a propelling device or devices attached at one end to the front part of the car, arranged to project backwardly, and attached at the other end to the safety net, and thereby pull the net as distinguished from pushing it, substantially as specified.

2. A wheel guard for a car, which consists essentially of a sheet of flexible material attached to the truck, having a loose bar on its front edge which is unsupported except by means of ropes or chains, extending from the platform of the car substantially as specified.

3. In combination with the truck, and platform of a car, a sheet of flexible material attached at one end to the truck, and at the other end to a loose bar connected to the platform by means of corks or chains only, and a holder whereby the front end of the said flexible material may be supported in an elevated position and released therefrom when necessary, substantially as specified.

4. In combination with a car truck and platform, a sheet of flexible material attached at one end to the said truck, and at the other end provided with a loose bar, cords or chains to connect the said bar with the platform, and a holder whereby the said bar may be supported, and which will admit of the said bar being released from the said platform, substantially as specified.

5. In combination with the truck and platform of a car, a sheet of flexible material attached to the said truck at one end, and at the other attached to the platform by means of a loose bar and cords or chains only, and a holder whereby the said bar may be supported from the platform and detached therefrom, substantially as specified.

GEORG BLAKISTONE.

Witnesses:
ROBERT W. BEACH,
DANL. FISHER.